Sept. 12, 1950  J. B. GALLIANO  2,521,711
ADJUSTABLE ECCENTRIC DRIVE
Filed Sept. 15, 1947  2 Sheets-Sheet 1

INVENTOR,
JOHN B. GALLIANO.
BY Stephen S. Townsend
ATTORNEY.

INVENTOR,
JOHN B. GALLIANO.
BY Stephen S. Townsend
ATTORNEY.

Patented Sept. 12, 1950

2,521,711

UNITED STATES PATENT OFFICE 2,521,711

ADJUSTABLE ECCENTRIC DRIVE

John B. Galliano, Oakland, Calif., assignor to Industrial Ideas, Inc., Oakland, Calif., a corporation of California Application September 15, 1947, Serial No. 774,061

6 Claims. (Cl. 74—117)

This invention relates to power transmissions, and, more particularly, to variable speed power transmissions adapted to transmit power to a driven shaft from a driving shaft.

This invention is in the nature of a continuation in part of the power transmission means invention described in my copending application for United States Letters Patent Serial No. 731,691, filed February 17, 1947, now abandoned for "Press and Power Transmission Means."

The principal object of the invention, as an improvement in power transmission means of the character disclosed in my aforementioned application, is to provide a mechanism which may be utilized under extremely rugged conditions without appreciable wear of the various parts, and which is noiseless and of positive action.

Referring to the drawings.

Figure 1:
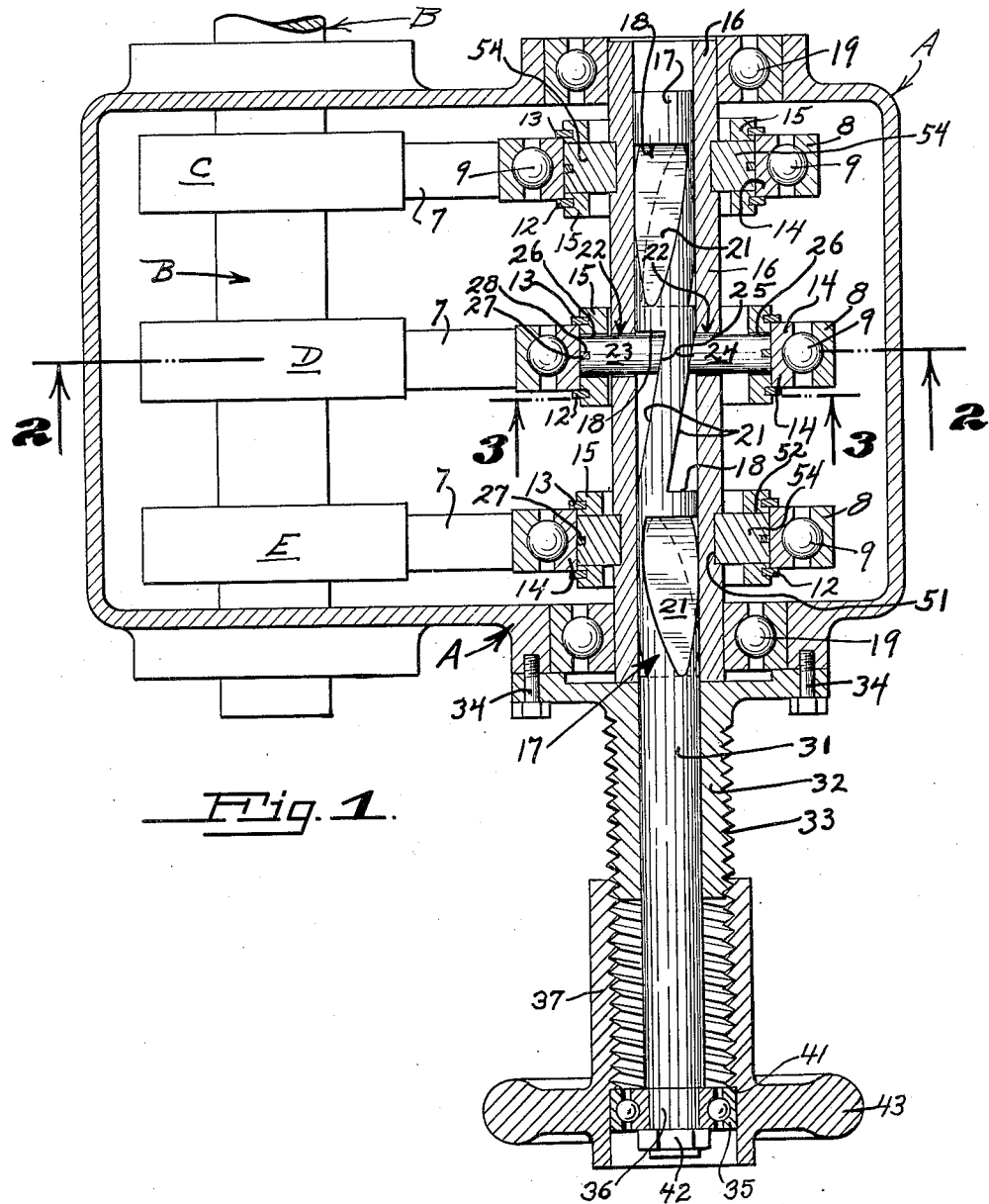
Fig. 1 is a top plan view of the transmission of power means, with the housing thereof and manual control shown in section.
Figure 2:
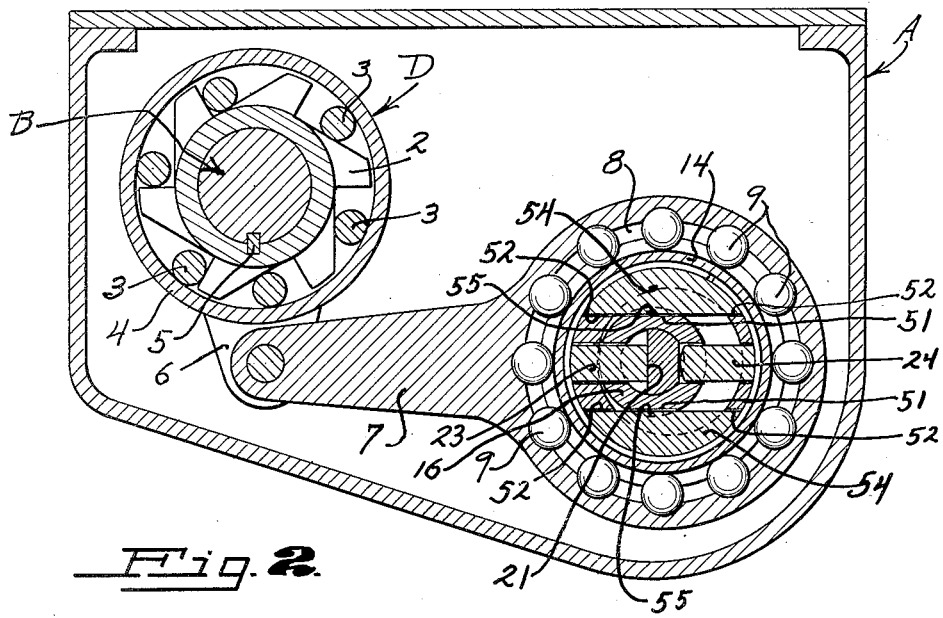
Fig. 2 is a sectional view, taken on line 2—2 of Fig. 1.

The invention comprises a housing, generally indicated at A, provided with bearings to receive a rotatable driven shaft B. The driven shaft B is provided with a plurality of overriding clutches C, D and E, of conventional character, and which comprise, as illustrated in Fig. 2, a roller bearing type of overriding clutch composed of a spider 2, rollers 3, and enclosing drum 4. The said clutch is keyed to the power output shaft B, as at 5. The drum 4 is provided with a projecting arm or lever 6, adapted for pivotal connection to a crank 7 and which is in turn mounted around a ball race, indicated at 8, to enclose ballbearings 9. The ballbearings are held in place by a pair of snap seal rings 12 and 13 disposed on opposite sides of a bearing 14.

A plurality of eccentrics 15 are disposed circumferentially around tubular driving shaft 16, said shaft being provided interiorly with a longitudinally slidable control rod 17. The shaft 16 is mounted in bearings 19 provided in the housing A and is connected to a suitable power input source (not shown). The control rod 17 is provided with a plurality of pairs of diametrically opposed notches 18 to form a plurality of opposed, oppositely inclined surfaces 21. The pairs of notches 18 are equally circumferentially spaced on control rod 18 and spaced longitudinally equally from one another. As illustrated, each pair of notches is disposed 120° from an adjacent pair of notches.

The shaft 16 is provided with a plurality of oppositely disposed bores 22 in alignment with the inclined flat surfaces 21. Control pins 23 and 24 project through the said bores and are provided with an inclined bottom surface 25 adapted to slide along the said inclined surfaces 21. The eccentrics 15 are also provided with diametrically opposed bores 26, through which the said pins project to abut against the inner side of bearings 14. Snap rings 27 are provided circumferentially of the eccentrics 15 and nest in slots 28 provided in the ends of the pins 23 and 24 in order to hold the assembly, comprising the eccentrics, pins and shaft 16, together.

Means to adjust the eccentric lift of the eccentrics is provided exteriorly of the housing and comprises an extension 31 of the control rod 17 which is disposed slidably exteriorly of the housing within a hollow boss 32 provided with an exterior thread 33. The boss 32 is connected to the housing A by means of bolts 34.

A bearing 35 is provided around a reduced diameter portion 36 of extension 31. A cylindrical control member 37 is provided with interior threads 38 threadably engaging the exterior threads of sleeve 32. The said control member 37 is provided with an annular offset shoulder portion 41, within which the bearing 35 is disposed. The extension 31 extends through the bearing 35 and is provided with a nut 42 to lock the assembly in place. The control member 37 is provided with a manual grip portion 43 to enable rotative movement of the said control member 37. Thus rotation of the member 37 causes relative slidable movement of the control rod 17 relative to shaft 16 and thus changes the position of the flat inclined surfaces 21 relative to the pairs of pins 23 and 24. This in turn changes the eccentric lift developed by the eccentrics 15 which, in turn, provide a greater or lesser stroke of the crank; the greater the eccentric lift developed by the eccentrics 15 the greater the stroke of crank 7, which, in turn, provides a faster turning movement of the driven shaft B. The rotation of the eccentrics 15 causes reciprocation of the cranks 7, causing intermittent rotation of the clutch members C, D and E to cause rotation of the output or driven shaft B.

Figure 3:
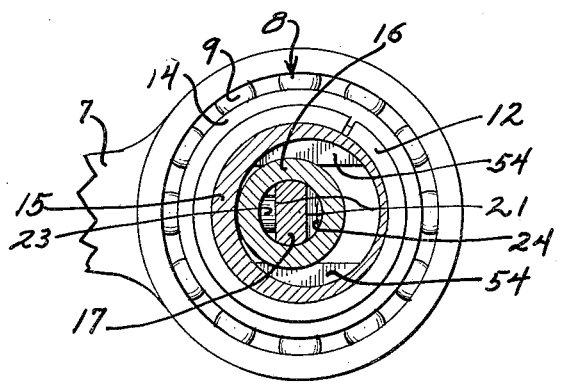
Fig. 3 is a sectional view taken on line 3—3 of Fig. 1.

Formed in the driving shaft diametrically opposed to one another and in alignment with the bores 22 and spaced therefrom is a pair of flat notches 51 parallel to one another. Formed in the eccentric 15 is a pair of diametrically opposed arcuate cut-outs 52 in the same relative position in the eccentric as the slots 51 are disposed relative to the bores 22 in the shaft. At this point it is noted that the eccentric is formed as a cylindrical member provided with an elongated bore, as clearly indicated in Fig. 3.

The control pins 23 and 24 are disposed in axial alignment with one another in the direction of the elongation of the eccentric bore. The flat slots 51 are provided in the shaft parallel to the longitudinal axes of the said pins 23 and 24. Disposed slidably and removably in each said slot 51 and notch 52 is a driving key 54 formed with a flat inner surface 55 and an outer arcuate side, which said arcuate side is disposed within the arcuate notch 52, while the flat inner side 55 is disposed slidably in each flat slot 51. The driving keys 54 may slide in the flat slots 51 so that the said eccentric may be moved by movement of the pins against bearing 14 to vary the eccentric lift developed by the eccentric upon rotation of the driving shaft. Further, the driving keys 54 supplement the control pins 23 and 24 to effect positive locking of the eccentric to the driving shaft for rotation therewith and prevents lateral movement of the eccentrics relative to the driving shaft.

The assembly of eccentric, bearing, pins 23 and 24, and keys 54 is identical for each eccentric disposed on the driving shaft, although, of course, the pins are aligned in accordance with the position of the inclined surfaces with which they coact.

The provision of oppositely disposed pins 23 and 24, which, in turn, ride against the flat inclined surfaces 21 and driving keys 54, has been found to enable a practically noiseless, positive acting power transmission mechanism of the character herein described. The said pins 23 and 24, which coact with the control rod, act as a positive mechanism for changing variably the eccentric lift developed by the eccentrics in unison while the mechanism is at rest or in operation. Further, driving keys 54 and the pins 23 and 24 act as a positive driving member to rotate the eccentric with the driving shaft. The coaction of the flat inclined surfaces with the cam bottoms of the pins 23 and 24, together with the coaction of the keys 54 and shaft, insures a positive drive mechanism.

The snap rings utilized in the present invention provide a sure and facile assembly of the unit to prevent undue movement of the crank shaft or bearings relative to the cams.

While the invention has been described in rather specific detail for purposes of example and illustration, it is to be understood that various changes and modifications may be made in the assembly and in the arrangement of parts to carry out the function of the invention within the spirit of the invention and the scope of the appended claims.

I claim:

1. In a mechanism for transmitting power to a load shaft from a driving shaft, a clutch mounted on said load shaft, an eccentric mounted on said driving shaft, means carried slidably by said driving shaft to lock said eccentric to said driving shaft for rotation therewith, a pair of oppositely disposed control pins mounted slidably in said driving shaft diametrically opposed to one another and projecting therefrom and through said eccentric, a bearing disposed circumferentially around said eccentric, means to lock releasably said bearing, eccentric and control pins together, said connecting rod connected to said eccentric whereby rotation of said eccentric causes reciprocation of said connecting rod to rotate said load shaft through said clutch, a control rod disposed slidably within said driving shaft, inclined surfaces formed in said control rod to coact with said control pins, and control means to effect selective slidable movement of said control rod relative to said driving shaft whereby to change eccentric lift developed by said eccentric during rotation of said driving shaft.

2. In a mechanism for transmitting power to a load shaft from a driving shaft, a clutch mounted on said load shaft, an eccentric mounted on said driving shaft, slots in said driving shaft diametrically opposed to one another, arcuate slots formed in said eccentric diametrically opposed to one another and positioned to correspond to said slots formed in said driving shaft, a driving pin disposed slidably in the slot formed in said driving shaft and a corresponding slot in said eccentric, and means comprising a control rod and associated control pins carried by said driving shaft and arranged to effect selective variation in the eccentric lift developed by said eccentric during rotation of said driving shaft, said connecting rod connected to said eccentric whereby rotation of said eccentric causes reciprocation of said connecting rod.

3. In a mechanism for transmitting power to a load shaft from a driving shaft, an eccentric mounted on said driving shaft, a bearing disposed circumferentially around said eccentric, driving pins carried by said driving shaft to coact with said eccentric to effect rotation thereof with said driving shaft, apertures provided in said driving shaft and said eccentric in registry with one another, control pins disposed in said apertures, the outer ends of said control pins abutting against the inner surface of said bearing, means to lock releasably said control pins, eccentric and bearing together, and movable means carried by said driving shaft and arranged to coact with said control pins to effect change of eccentric lift during rotation of said driving shaft.

4. A mechanism for transmitting power to a load shaft from a driving shaft, according to claim 3, and wherein a housing is disposed around said mechanism, the means to lock releasably the eccentric, control pins and bearing together comprises at least one annular spring member disposed circumferentially around said eccentric, and having control means disposed exteriorly of said housing to control said movable means carried by said driving shaft and arranged to coact with said control pins to change eccentric lift.

5. In a mechanism for transmitting power to a load shaft from a driving shaft, an eccentric mounted on said driving shaft, a bearing mounted circumferentially around said eccentric, driving pins carried slidably by said driving shaft and arranged to coact slidably with said eccentric, apertures provided in said driving shaft and through said eccentric in registry with one another, control pins disposed slidably in said apertures, the outer ends of said control pins abutting against the inner surface of said bearing, and movable means carried by said driving shaft and arranged to coact with said control pins to effect change of eccentric lift during rotation of said driving shaft.

6. In a mechanism for transmitting power to a load shaft from a hollow driving shaft, an eccentric mounted on said driving shaft, a bearing disposed circumferentially around said eccentric, driving pins carried slidably by said driving shaft to coact slidably with said eccentric to effect rotation thereof with said driving shaft, apertures provided in said driving shaft and through said eccentric, control pins disposed in said apertures, the outer ends of said control pins abutting against the inner surface of said bearing and the inner ends of said control pins provided with inclined surfaces, spring means to lock releasably said control pins, eccentric and bearing together, a rod carried slidably in said driving shaft and arranged to coact with the inner ends of said control pins whereby upon slidable movement of said rod change of eccentric lift is effected during rotation of said driving shaft, means disposed exteriorly of said mechanism for effecting slidable movement of said rod, and means connected to said bearing and said load shaft to transmit movement of said eccentric during rotation thereof to said load shaft.

JOHN B. GALLIANO.

REFERENCES CITED

The following references are of record in the file of this patent:

UNITED STATES PATENTS

| Number | Name | Date |
|---|---|---|
| 678,364 | Heymann | July 16, 1901 |
| 1,081,636 | Sundh | Dec. 16, 1913 |